United States Patent
Xu et al.

(10) Patent No.: US 6,692,586 B2
(45) Date of Patent: Feb. 17, 2004

(54) HIGH TEMPERATURE MELTING BRAZE MATERIALS FOR BONDING NIOBIUM BASED ALLOYS

(75) Inventors: Raymond R. Xu, Carmel, IN (US); Amit Chatterjee, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 163 days.

(21) Appl. No.: 09/864,048

(22) Filed: May 23, 2001

(65) Prior Publication Data

US 2003/0049154 A1 Mar. 13, 2003

(51) Int. Cl.[7] ............................................. C22C 14/00
(52) U.S. Cl. ........................ 148/421; 420/417; 420/418; 420/421; 228/262.7; 228/262.72
(58) Field of Search .................................. 420/417, 418, 420/421; 148/407, 421; 228/262.7, 262.72

(56) References Cited

U.S. PATENT DOCUMENTS

| | | | |
|---|---|---|---|
| 3,172,196 A | 3/1965 | Beaver et al. ................. 75/245 |
| 3,220,828 A | * 11/1965 | Kaarlela ....................... 420/421 |
| 3,231,344 A | 1/1966 | Beaver et al. ................. 75/245 |
| 3,262,778 A | * 7/1966 | Kaarlela, II .................. 420/421 |
| 3,265,491 A | * 8/1966 | Kaarlela, III ................. 420/421 |
| 3,309,767 A | * 3/1967 | Sama et al. .................. 420/417 |
| 3,366,475 A | * 1/1968 | Kaarlela, IV ................. 420/421 |
| 3,425,116 A | 2/1969 | Crooks et al. ................ 228/121 |
| 3,737,343 A | 6/1973 | Basseches et al. ........... 117/227 |
| 3,778,260 A | 12/1973 | Kawabe et al. .............. 420/425 |
| 3,816,111 A | 6/1974 | Schneider ..................... 420/428 |
| 3,945,859 A | 3/1976 | van Beijnen ................... 148/96 |
| 3,955,039 A | 5/1976 | Roschy et al. ............... 428/457 |
| 4,000,026 A | 12/1976 | Rexer ............................ 156/49 |
| 4,129,166 A | 12/1978 | Sigsbee ........................ 164/46 |
| 4,151,329 A | 4/1979 | Sigsbee ........................ 428/607 |
| 4,151,330 A | 4/1979 | Sigsbee ........................ 428/607 |
| 4,154,901 A | 5/1979 | Sigsbee ........................ 428/607 |
| 4,202,931 A | 5/1980 | Newkirk et al. ............. 428/662 |
| 4,381,944 A | * 5/1983 | Smith, Jr. et al. ............. 75/255 |
| 4,425,318 A | 1/1984 | Maeland et al. ............. 423/644 |
| 4,465,511 A | 8/1984 | Sale et al. ..................... 75/351 |
| 4,705,207 A | * 11/1987 | Norris ......................... 228/194 |
| 4,706,872 A | * 11/1987 | Norris ......................... 228/194 |
| 5,030,300 A | 7/1991 | Hashimoto et al. .......... 148/403 |
| 5,098,470 A | * 3/1992 | Wood et al. .................. 75/255 |
| 5,126,106 A | 6/1992 | Hidaka et al. ............... 420/428 |
| 5,180,446 A | 1/1993 | Tsukuta et al. .............. 148/422 |
| 5,236,661 A | 8/1993 | Hidaka et al. ............... 420/428 |
| 5,264,293 A | 11/1993 | Benz et al. ................... 428/549 |
| 5,296,309 A | 3/1994 | Benz et al. ................... 428/614 |
| 5,304,427 A | 4/1994 | Benz et al. ................... 428/567 |
| 5,366,565 A | 11/1994 | Jackson ........................ 148/426 |
| 5,380,375 A | 1/1995 | Hashimoto et al. .......... 148/403 |
| 5,447,683 A | 9/1995 | Montgomery et al. ....... 420/117 |
| 5,454,884 A | 10/1995 | Hashimoto et al. .......... 148/403 |
| 5,458,705 A | 10/1995 | Mazur et al. ................ 148/669 |
| 5,460,663 A | 10/1995 | Hashimoto et al. .......... 148/403 |
| 5,482,577 A | 1/1996 | Hashimoto et al. .......... 148/403 |
| 5,486,242 A | 1/1996 | Naka et al. .................. 148/422 |
| 5,580,403 A | 12/1996 | Mazur et al. ................ 148/407 |
| 5,608,174 A | 3/1997 | Eck et al. ..................... 75/235 |
| 5,624,505 A | 4/1997 | Mazur et al. ................ 148/407 |
| 5,718,777 A | 2/1998 | Hashimoto et al. .......... 148/403 |
| 5,733,425 A | 3/1998 | Fang et al. ................... 204/293 |
| 5,904,480 A | 5/1999 | Farzin-Nia et al. ........... 433/20 |
| 5,930,332 A | 7/1999 | Eggleston et al. ........... 378/144 |
| 5,932,033 A | 8/1999 | Jackson et al. ............. 148/422 |
| 5,983,978 A | 11/1999 | Vining et al. ................ 164/312 |
| 6,149,051 A | * 11/2000 | Vollmer et al. ......... 228/262.72 |

OTHER PUBLICATIONS

VanVlack, Lawrence H., Elements of Materials Science and Engineering, third edition, Addison–Wesley 1975, p. 67.*
ASM Handbook, vol. 3, Phase Diagrams, ASM International 1992, pp. 2.161 and 2.367.*
Bewlay, B.P., Lewandowski, J.J., and Jackson, M.R. *Refractory Metal–Intermetallic In–Situ Composites for Aircraft Engines* JOM Aug. 1997.
Jackson, M.R., Bewlay, B.P., Rowe, R.G., Skelly, D.W., and Lipsitt, H.A. *High–Temperature Refractory Metal–Intermetallic Composites* JOM Jan. 1996.
Subramanian, P.R., Mendiratta, M.G., Dimiduk, D.M., and Stucke, M.A. *Advanced intermetallic alloys–beyond gamma titanium aluminides* Materials Science and Engineering (1–3) 1997.

* cited by examiner

*Primary Examiner*—George Wyszomierski
(74) *Attorney, Agent, or Firm*—Woodard, Emhardt, Moriarty, McNett & Henry LLP

(57) ABSTRACT

This invention relates to a high temperature melting composition and a method of using the composition for brazing high temperature niobium-based substrates, such as niobium-based refractory metal-intermetallic compositions (RMIC), including but not restricted to niobium-silicide composite alloys. The high temperature melting composition can include one or more alloys. The alloys include a base element selected from titanium, tantalum, niobium, hafnium, silicon, and germanium. The alloys also include at least one secondary element that is different from the base element. The secondary element can be selected from chromium, aluminum, niobium, boron, silicon, germanium and mixtures thereof. When two or more alloys are included in the composition, it is preferable, but not required, to select at least one lower melting alloy and at least one higher melting alloy. The composition is preferably a homogeneous mixture of the two or more alloys combined in powder form.

38 Claims, 4 Drawing Sheets

HIGH TEMPERATURE MELTING BRAZE MATERIALS FOR BONDING NIOBIUM BASED ALLOYS

GOVERNMENT RIGHTS

The U.S. Government has paid-up rights in this invention and the right in limited circumstances to require the Patent Owner to license others on reasonable terms as provided by the terms of Contract No. F33615-98-C-5215 awarded by the United States Air Force.

BACKGROUND OF THE INVENTION

This invention relates to a high temperature melting composition and a method of using the composition for brazing. More specifically, but not exclusively, this invention is directed to a braze alloy, mixtures of braze alloy compositions, and methods of brazing niobium-based high temperature composites.

High temperature niobium-based alloys, such as niobium-based refractory metal-intermetallic composites (RMICs), offer combinations of superior oxidation resistance at temperatures from about 1000° C. to about 1500° C., good low temperature toughness, good high temperature strength and creep resistance, and desirable microstructure. Currently nickel and cobalt alloys are used for many high temperature applications. However, these alloys show signs of incipient melting at a temperature range of about 1260 to 1300° C. It is at these high temperatures that niobium-based alloys show the greatest advantage by having good strength and creep resistance. For example, use of the high temperature niobium-based silicide composite (Nb—Si) alloys in advanced jet engine turbine hot sections allows the turbines to operate at higher temperatures and, consequently, allows greater power production and higher efficiency. The niobium-based alloys require new technology to fabricate turbine components including new braze technology and braze alloys to take advantage of the superior properties of the niobium-based alloys.

The high temperature niobium-based alloys typically contain one or more metals or intermetallic elements, such as aluminum, titanium, chromium, and/or silicon. There are a number of technical difficulties that must be overcome to braze niobium-based alloys containing these elements. Conventional braze alloys containing nickel, cobalt, and/or gold typically exhibit melting temperatures below about 1200° C. Consequently, joints brazed with nickel, cobalt, and/or gold alloys have very low or no mechanical strength and oxidation resistance at temperatures above about 1250° C.

Another drawback to the use of nickel, cobalt, and/or gold-based braze alloys is their tendency to form low melting eutectic phases in braze joints and the areas adjacent the braze joints. The eutectic phases develop from alloy interaction, and diffusion between constituents of the braze alloy and the high temperature melting substrate alloy, the niobium-based alloy. For example, nickel has a very low solubility in niobium-based alloys, since nickel and niobium atoms have very different sizes and electronic structures. When nickel is added to a niobium-based alloy, instead of forming a solid solution, nickel substitutes for some of the niobium atoms in the bulk niobium-based alloy and can combine with remaining niobium atoms to form a new nickel-niobium compound as a nickel-niobium intermetallic phase in the braze joint and/or in the area adjacent the bulk niobium-based alloy. The new nickel-niobium compound contains eutectic phases that melt at much lower temperatures than the melt temperature of the original niobium-based alloy and even the original brazed alloy. As an example, a new nickel-niobium compound containing about 76 wt % Ni and about 23 wt % Nb would have a predicted melting temperature of about 1282° C. Similar low temperature eutectic phases would form if cobalt-based braze alloys or gold-based braze alloys were used to braze the niobium-based RMIC. The gold-based braze alloy would be particularly detrimental since it would form a low temperature eutectic phase (gold-silicon eutectic phase) that has a melting temperature of about 360° C. The resulting braze joint and surrounding areas would then be susceptible to failure and oxidation at high temperatures. This would obviously render components made from the brazed materials useless in the high temperature sections of turbine engines.

Thus, in light of the above-described problems, there is a continuing need for advancements in the relevant field, including improved braze compositions and methods for fabrication and braze repair of high temperature melting niobium-based alloys. The present invention is such advancement and provides a wide variety of benefits and advantages.

SUMMARY OF THE INVENTION

Figure 1:
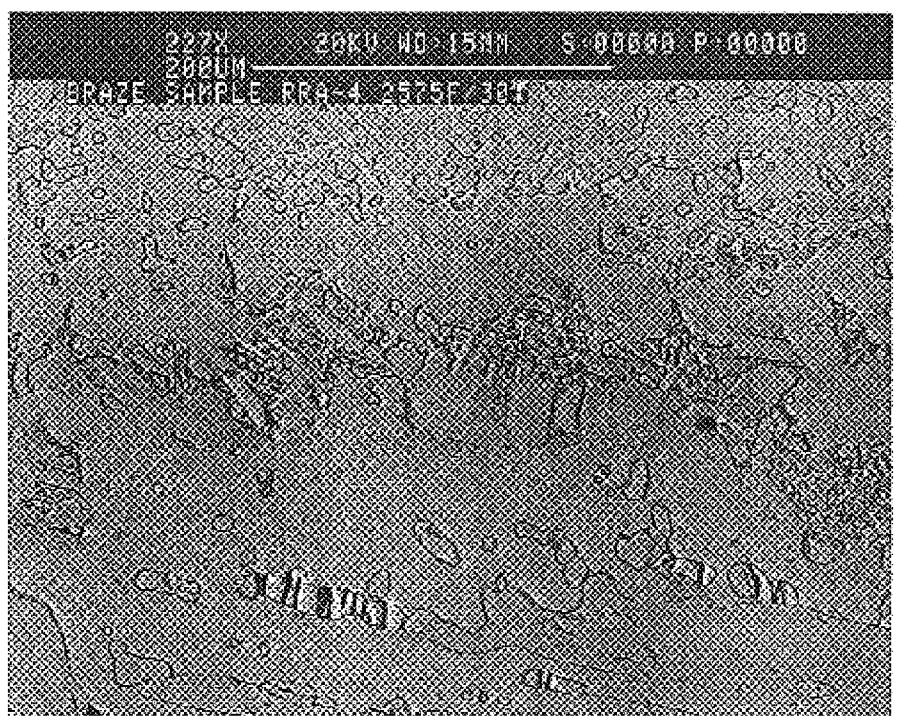
FIG. 1 is a scanned image of scanning electron microscope (SEM) micrograph with secondary electron image (SEI) of a braze joint fabricated using a Ti—Cr braze alloy according to the present invention.

The present invention relates to high temperature melting compositions and their use. Various aspects of the invention are novel, non-obvious, and provide various advantages. While the actual nature of the invention covered herein can only be determined with reference to the claims appended hereto, certain forms and features, which are characteristic of the preferred embodiments disclosed herein, are described briefly as follows.

In one form, the present invention provides a composition that comprises one or more high temperature melting alloys. The high temperature melting alloy includes a base element selected from the group of titanium, tantalum, niobium, hafnium, silicon, and germanium and at least one secondary element that is different from the base element. The secondary element is selected from the group of chromium, aluminum, niobium, boron, silicon, germanium and mixtures thereof.

In preferred embodiments, the high temperature melting alloy is a braze alloy that has a melting point between about 1300° C. and 1650° C. Further, the braze alloy can be provided as a crystalline solid. The alloy can be provided to have a nominal composition comprising, in weight percent, up to about 43.4% chromium, up to about 26.3% aluminum, up to about 91.5% titanium, up to about 74.5% tantalum, up to about 98.3% niobium, up to about 89.5% hafnium, up to about 2.25% boron, and up to about 71.5% silicon.

In another form, the present invention provides a composition comprising braze alloy for brazing niobium-based intermetallic substrates. The braze alloy can be provided as a eutectic mixture of a base metal or intermetallic element and one or more secondary metals or intermetallic elements that are different from the base metal/element. The base metal/element is selected from the group of titanium, tantalum, niobium, hafnium, silicon, and germanium, and the secondary metal(s)/element(s) are selected from the group of chromium, aluminum, niobium, boron, silicon, germanium and mixtures thereof. Preferably the braze alloy is selected to have a melting point between about 1250° C. and the melting temperature of the niobium-based intermetallic substrate. In other embodiments, the composition is provided to exhibit a crystalline structure. In other preferred embodiments, the braze alloy is provided to be substantially free of nickel, cobalt, and/or gold metals. Furthermore, the braze alloy can be provided to exclude or, at most, include only a minimum amount of a melting point depressant and yet, the braze alloy still melts and/or diffuses into the underlying niobium-based intermetallic substrate.

In yet another form, the present invention provides a process of brazing a niobium-based substrate. The process comprises applying a braze composition to the niobium-based substrate to be brazed. The braze composition comprises a base element selected from titanium, tantalum, niobium, hafnium, silicon, and germanium, and at least one secondary element that is different from the base element; the secondary element is selected from the group of chromium, aluminum, niobium, boron, silicon, germanium, and mixtures thereof. The braze-coated substrate is heat treated to a selected temperature sufficient to induce at least a portion of the braze composition to melt. The hot braze-coated substrate is maintained at the selected temperature for a desired length of brazing time. Thereafter, the substrate is cooled. Preferably the braze temperature is selected to be at least about 1250° C. yet lower than the melting point temperature of the niobium-based substrate. In selected embodiments, the brazed substrate can be subjected to a diffusion heat treatment by maintaining the substrate at a second temperature suitable for diffusion. Preferably, the second temperature is selected to be between about 1100° C. and about 1370° C.

It is an object of the present invention to provide a high temperature melting braze material to bond niobium-based alloys.

Further objects, features, aspects, forms, advantages and benefits of the invention shall become apparent from the description and drawings contained herein.

DETAILED DESCRIPTION OF THE INVENTION

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described alloy compositions and processes, and any further applications of the principles of the invention as described herein, are contemplated as would normally occur to one skilled in the art to which the invention relates.

In general, this invention provides a metallic composition having a high melting temperature. In one embodiment, the metallic composition is a high temperature melting alloy. The high temperature melting alloy has a base element selected from the group of titanium, tantalum, niobium, hafnium, silicon, and germanium. The high temperature melting alloy also includes at least one secondary element that is different from the base element. The secondary element can be selected from a group of chromium, aluminum, niobium, boron, silicon, germanium and mixtures thereof. In other embodiments, the metallic composition can include a combination of two or more of the high temperature melting alloys. The combination can be prepared by mixing the individual alloys. The metallic compositions according to the present invention are useful as braze compositions for the repair and bonding fabrication of high-temperature alloy substrates, such as a braze filler material for niobium-based RMIC's.

In one form, the metallic composition can be provided as a single alloy. The alloy can be an alloy consisting of two or more metals/intermetallic elements. More preferably, the alloy is either a binary alloy or a ternary alloy. The nominal compositions of preferred examples of high temperature melting alloys according to this invention are listed below in Table 1.

TABLE 1

High Melt Temperature Alloys[1,2]

| Alloy | Cr | Al | Ti | Ta | Nb | Hf | B | Si | Ge |
|---|---|---|---|---|---|---|---|---|---|
| 1 | 19.5–29.5 | 0.01 | 45–55 | 0.01 | 0.01 | 0.01 | 0.01 | 17.5–27.5 | 0.01 |
| 2 | 0.01 | 0.01 | 85–95 | 0.01 | 0.01 | 0.01 | 0.01 | 5–15 | 0.01 |
| 3 | 24.5–34.5 | 0.01 | 0.01 | 0.01 | 0.01 | 0.01 | 0.01 | 65.5–75.5 | 0.01 |
| 4 | 38.5–48.5 | 0.01 | 51.5–61.5 | 0.01 | 0.01 | 0.01 | 0.01 | 0.01 | 0.01 |
| 5 | 0.01 | 0.01 | 0.01 | 0.01 | 90.0–99.8 | 0.01 | 0.02–10 | 0.01 | 0.01 |
| 6 | 5.5–15.5 | 0.01 | 0.01 | 0.01 | 0.01 | 84.5–94.5 | 0.01 | 0.01 | 0.01 |
| 7 | 30.5–40.5 | 0.01 | 0.01 | 0.01 | 59.5–69.5 | 0.01 | 0.01 | 0.01 | 0.01 |
| 8 | 0.01 | 20.5–30.5 | 0.01 | 0.01 | 69.5–79.5 | 0.01 | 0.01 | 0.01 | 0.01 |
| 9 | 0.01 | 20.5–30.5 | 0.01 | 69.5–79.5 | 0.01 | 0.01 | 0.01 | 0.01 | 0.01 |
| 10 | 0.01 | 0.01 | 0.01 | 0.01 | 41.5–51.5 | 0.01 | 0.01 | 0.01 | 48.5–58.5 |

[1]The values are expressed in weight percent based upon the total weight of the alloy.
[2]A value of 0.01 indicates only that this element was not intentionally added to the alloy.

Each of the alloys according to the present invention can be prepared as a crystalline solid or alloy. As such, the elements in the alloy are provided in a stoichiometric ratio. The crystalline alloy can be processed to yield an alloy product exhibiting properties suitable for braze bonding. For example, the crystalline alloy can be pulverized to provide a powder. Alternatively, the alloy can be pressed and/or formed into foils, rods, billets or buttons and the like.

The elements used to prepare the alloys according to this invention are selected to provide a braze composition having a melting point, or a solidus temperature at which the alloy initially begins to melt, of at least about 1250° C., more preferably at least about 1300° C. The alloys of this invention are molten at a temperature of 1675° C. and lower, more preferably at a temperature of about 1450° C. and lower.

In other embodiments, the braze alloy according to the present invention is provided as a eutectic alloy of metallic elements or both metallic and intermetallic elements. The eutectic alloy is still provided as a high temperature melting alloy, but the ratio of metallic and/or intermetallic elements are in a range selected to provide the eutectic alloy for the selected combination of elements. Preferably the high temperature melting composition according to this invention comprises a eutectic alloy consisting of a base metal or intermetallic element and one or more secondary elements, different from the base metal/element. The base metal/element is selected from the group consisting of titanium, tantalum, niobium, hafnium, silicon, and germanium. The secondary element is selected from the group consisting of chromium, aluminum, niobium, boron, silicon, germanium and mixtures thereof. Specific examples of eutectic alloys are listed below in Table 2.

higher than or equal to about 1550° C. Preferably the melting temperature of these alloys is lower than or equal to about 1675° C.; more preferably lower than or equal to about 1650° C. Alloys 5, 7–10, 15 and 17–20 are examples of the high-melt alloys.

In other embodiments the metallic braze compositions according to this invention can be provided as a single metal alloy or as a mixture of metal alloys. For example, the braze composition according to this invention can include any of the single metal alloys listed above in Table 1 or 2. Alternatively, the braze composition of this invention can include two or more of the alloys listed above in either Table 1 or Table 2. Non-limiting examples of combinations of braze compositions including two or more alloys are listed below in Table 3. Although only a few exemplary alloy combinations are listed below, it should be understood that all combinations of the alloys listed in Tables 1 and 2 are intended to be included within the scope of the present invention. The braze compositions comprising mixtures of alloys can be prepared by techniques commonly known in the art to prepare powdered metallic mixtures.

TABLE 2

Eutectic Alloys[1,2]

| Alloy | Melting Temperature (° C.) DTA[3] | Cr | Al | Ti | Ta | Nb | Hf | B | Si | Ge |
|---|---|---|---|---|---|---|---|---|---|---|
| 11 | 1516.1 | 24.5–25.1 | 0.01 | 51.8–52.8 | 0.01 | 0.01 | 0.01 | 0.01 | 22.4–23.4 | 0.01 |
| 12 | 1371.0 | 0.01 | 0.01 | 90.5–91.5 | 0.01 | 0.01 | 0.01 | 0.01 | 8.5–9.5 | 0.01 |
| 13 | 1363.0 | 28.5–29.5 | 0.01 | 0.01 | 0.01 | 0.01 | 0.01 | 0.01 | 70.5–71.5 | 0.01 |
| 14 | 1403.1 | 42.5–43.5 | 0.01 | 56.5–57.5 | 0.01 | 0.01 | 0.01 | 0.01 | 0.01 | 0.01 |
| 15 | 1590.0 | 0.01 | 0.01 | 0.01 | 0.01 | 97.7–98.3 | 0.01 | 1.95–2.25 | 0.01 | 0.01 |
| 16 | 1367.0 | 10.7–11.3 | 0.01 | 0.01 | 0.01 | 0.01 | 88.5–89.5 | 0.01 | 0.01 | 0.01 |
| 17 | 1650.0 | 35.5–36.5 | 0.01 | 0.01 | 0.01 | 63.5–64.5 | 0.01 | 0.01 | 0.01 | 0.01 |
| 18 | 1591.4 | 0.01 | 25.8–26.3 | 0.01 | 0.01 | 73.5–74.5 | 0.01 | 0.01 | 0.01 | 0.01 |
| 19 | 1554.7 | 0.01 | 25.8–26.3 | 0.01 | 73.5–74.5 | 0.01 | 0.01 | 0.01 | 0.01 | 0.01 |
| 20 | 1591.1 | 0.01 | 0.01 | 0.01 | 0.01 | 46.5–47.5 | 0.01 | 0.01 | 0.01 | 52.5–53.5 |

[1]The values are expressed in weight percent based upon the total weight of the alloy.
[2]A value of 0.01 indicates only that this element was not intentionally added to the alloy.
[3]DTA, differential thermal analysis.

The alloys according to this invention can be classified according to their melt temperature into one of two classes of alloys. Both classes of alloys have high melting points compared with convention braze alloys; however, when selected alloys according to this invention are compared to each other, one class has a higher melt temperature than the other class. One class of alloys, the "low-melt alloys" have melt temperatures at least as high as 1250° C. and more preferably as high as 1350° C. Preferably the melting temperature is lower than or equal to about 1520° C.; more preferably lower than or equal to about 1500° C. Alloys 1–4, 6, 11–14 and 16 are examples of "low melt alloys".

The other class of alloys are the "high-melt alloys". Generally, the high-melt alloys have a melting temperature higher than or equal to about 1500° C.; more preferably

TABLE 3[1,2]

| Alloy Mixture | Cr | Al | Ti | Ta | Nb | Hf | B | Si | Ge |
|---|---|---|---|---|---|---|---|---|---|
| 21 | 11.6–15.4 | 0.3–3.3 | 0.01–20.5 | 1.7–5.7 | 37.2–41.2 | 2.4–6.5 | 0.01–2.8 | 16.7–20.7 | 0.01 |
| 22 | 12.5–14.5 | 0.1–2.0 | 10.5–30.5 | 1.0–10.0 | 20.5–60.0 | 1.5–10.5 | 0.01–2.5 | 10.0–30.0 | 0.01 |
| 23 | 0.01–43.5 | 0.01 | 0.01–91.5 | 0.01 | 0.01 | 0.01 | 0.01 | 0.01–71.5 | 0.01 |
| 24 | 0.01–43.5 | 0.01–26.3 | 0.01–91.5 | 0.01–74.5 | 0.01–74.5 | 0.01–89.5 | 0.01–2.25 | 0.01–71.5 | 0.01–53.5 |

[1]The values are expressed in weight percent based upon the total weight of the alloy.
[2]A value of 0.01 indicates only that this element was not intentionally added to the alloy.

The braze composition can include a mixture of alloys. Any combination of alloys listed above in Tables 1 and 2 can be used. However, a preferred braze composition includes at least one low melt alloy. More preferably, the braze composition includes at least one low-melt alloy and at least one high-melt alloy. Combining one or more low-melt alloys and one or more high-melt alloys provides a braze composition that exhibits a melting temperature suitable for use with niobium-based substrates. Braze compositions combining at least one low-melt alloy and at least one high-melt alloy exhibit desirable properties for brazing niobium-based substrates such as, but not restricted to, niobium-silicon containing alloys.

While not intending to be bound by any theory, it is thought that the lower melting alloy begins to melt within a selected braze bonding processing temperature range and provides a initial melt solution into which the higher melting alloy can dissolve and/or diffuse. The resulting alloy mixture can flow and/or bond to the underlying substrate.

In practice, the braze bonding processing temperature is selected to be lower than the melt temperature of the niobium-based substrate. In one form, it is preferable to select lower melting alloys and higher melting alloys to provide an alloy mixture that exhibits an incipient or an initial melting temperature lower than the braze processing temperature. In other forms, it is preferable to select the lower melt alloys and the higher melting alloys to provide a braze composition that initially melts at a first temperature lower than the braze processing temperature and provides a braze joint formed of material that re-melts at a second temperature higher than the first temperature.

The braze compositions according to the present invention can be provided in a wide variety of forms, including as foils, powders, slurries and/or metallic buttons or slugs. When the braze composition is provided as a metal foil, the thickness of the foil can vary. The preferred thickness for the foil is between about 50 micrometers and about 300 micrometers thick. The foil can be prepared by conventional roll forming or melt-spun processes. However, for this invention, the foils were fabricated by using electrical-discharge wire cutting (EDWC) of button ingots that were produced by non-consumable DC vacuum arc melting. An oxide recast layer that formed on the foil surfaces during EDWC process was removed by using mechanical polishing and/or chemical etching methods.

When the braze composition is provided in the form of a foil, one or more layers of the foil can be placed between adjacent surfaces of the components to be braze bonded. If two or more layers of foil are used, it is preferable, but not required, that each foil is formed of the same braze composition. If desired, the components can be held in a fixture and/or clamped together to ensure that the bonding faces of the components remain proximal to each other or, more preferably, in contact with each other. Then the components and alloy foil are heat treated to melt at least a portion of the braze composition and form a braze joint that bonds the components together.

The braze composition also can be provided as a metal powder. The braze composition can be pulverized, for example, in a ball mill to provide the powder. In one form, the powder can be prepared by re-melting prealloyed buttons in an atomizer using tungsten arc melting and inert gas atomization. Preferably the resulting powdered braze composition has an average particle size between about −100 mesh to about +230 mesh, more preferably between about −50 mesh to about +200 mesh. The powdered braze composition can be used as a powder or, alternatively, the powdered braze composition can be slurred.

When provided as a slurry, the braze compositions are preferably mixed with an organic binder, such as Vitta Gel ST commercially available from Vitta Corporation. The binder is chosen to hold the alloy powder together and inhibit partitioning and/or separation. The binder can also facilitate adhesion of the braze composition to the substrate in the area where the slurry is applied. When subjected to a braze heat treatment, the binder decomposes cleanly, well below the brazing temperatures, leaving no residue that hinders bonding of the components or that weakens the braze joint.

The resulting braze composition in the desired form is applied to the substrate for brazing. For example the braze composition either as a powder or a slurry is applied to a substrate, either to join one or more components and/or to fill a defect. After applying the braze composition to the underlying substrate, the braze-coated substrate is then heat treated by heating to a temperature sufficiently high to melt at least a portion of the braze composition.

When a single alloy is used for the braze composition, it is preferable to heat the braze-coated metal substrate up to a desired temperature selected to be between about 1250° C. and about 1600° C. The braze-coated substrate can be maintained at the desired temperature for a time period ranging between about 5 minutes to about 240 minutes. In preferred forms, the braze-coated substrate is heated to a temperature between about 1300° C. to about 1525° C. for a time between 10 minutes and 30 minutes. Preferably this heat treatment is conducted under vacuum or, more preferably, under an atmosphere of argon. In one specific embodiment, during the heat treatment, the braze-coated substrate is maintained in an atmosphere of about 400 μm partial pressure of argon. For brazing niobium-based RMIC substrates, it is preferable to protect the braze-coated substrate from adventitious introduction of oxygen at high temperatures above about 800° C. In addition to maintaining the hot, braze-coated substrate in a partial pressure of an inert gas, the coated substrate can also be enclosed in a container that includes an oxygen reactive metal, such as, tantalum. This protects the braze joint from oxygen. The tantalum container can also inhibit vaporization of chromium, silicon and titanium from the braze composition and from the substrate. It is preferred to allow the braze composition to completely melt and flow over the joint and/or defect in the underlying substrate.

After the braze-coated substrate has been maintained at the selected temperature for the desired amount of time, it is cooled. The cooling rate can vary widely depending upon the metallic components of the braze composition and/or the desired microstructure of the braze joint. For example, when a single alloy is used as a braze composition, the coated substrate can be cooled at a furnace cooling rate which provides a cooling rate of between about 25° C. to about 75° C. per minute.

When the braze composition includes mixtures of alloys, the braze-coated substrate is heated to a selected temperature sufficiently high to melt at least a portion of the lower melting alloy to provide the brazed assembly. Preferably the braze-coated substrate is heated to a temperature sufficiently high to fully melt the lower melting alloy. Typically, the braze-coated substrate is heated to a temperature selected to be at least about 1200° C. and less than about 1500° C. More preferably, the braze-coated substrate is heated to a temperature selected to be at least about 1350° C. and less than about 1520° C. After the braze-coated substrate has been subjected to a braze heat treatment at a first selected temperature, the brazed assembly can be subjected to a diffusion heat treatment at a second temperature sufficient to allow the alloy components to diffuse. Typically, the second temperature, which may or may not be equal to the first temperature, is selected to be between about 1100° C. and about 1425° C. The brazed assembly is maintained at the diffusion temperature for a desired length of time sufficient to allow the braze alloy composition to diffuse into the underlying substrate, and/or allow the low-melt alloy compositions to diffuse into high-melt alloy compositions in the braze joint. Typically, the diffusion time is selected to be between about 1 hr. and about 100 hrs., more preferably between about 2 hrs. and about 50 hrs. Thereafter, the brazed assembly is then cooled back to room temperature. Preferably the substrate is cooled at a rate ranging between about 20° C. per minute to about 250° C. per minute, more preferably between about 50° C. and about 225° C. per minute. Again the cooling rate can vary depending upon the metallic composition used for the braze alloy and/or the desired microstructure of the braze joint.

The present alloy compositions provide particular advantages for bonding and/or repairing niobium-based alloys, particularly niobium refractory metal-intermetallic compositions (RMIC). In preferred embodiments, the braze compositions can be provided without the necessity of adding nickel, cobalt, and/or gold to produce a strong braze joint. Additionally, the present braze alloy composition substantially eliminates or reduces the use of a melting point depressant, such as boron, in the braze composition. Despite the virtual lack of any melting point depressant, the metallic braze compositions of the present invention melt at a temperature sufficiently low that the underlying substrate does not begin to soften and/or weaken during the brazing process.

In preferred embodiments, the alloys of this invention are selected to provide a braze joint having high oxidation resistance, particularly at elevated temperatures, such as found in the hot sections of turbine engines. The oxidation resistance of the braze joint can be evaluated using cyclic, static or dynamic oxidation tests. Preferably the oxidation resistance of the braze joint is at least equal to the oxidation resistance of the substrate alloy.

The resulting braze composition is particularly useful to braze niobium-based substrates and/or repair defects in niobium-based substrates. This invention provides particular advantages for brazing high temperature Nb—Si intermetallic substrates. In preferred embodiments, the present invention provides a braze composition that avoids or minimizes the detrimental low-melting eutectic phases in the braze joints by using braze alloys in which the alloy elements are selected from the elements found in the Nb—Si intermetallic substrates. Minimizing the low melt eutectic phases in the braze strengthens the joints, particularly at higher temperature, because the joints can withstand the high temperatures without softening and/or weakening.

For the purpose of promoting further understanding and appreciation of the present invention and its advantages, the following Examples are provided. It is understood, however, that these Examples are illustrative and not limiting in any fashion.

EXAMPLE 1

Braze Alloy Preparation

A braze alloy was provided in a button ingot of about 2.75 inches in diameter and about 0.5 inch thick that was produced by non-consumable DC vacuum arc melting. Braze alloy foils were fabricated by using electrical-discharge wire cutting (EDWC) the button ingot. An oxide recast layer that formed on the braze foil surfaces during EDWC process was removed by using mechanical polishing and/or chemical etching methods. The braze alloy was then provided for the brazing process as a thin foil having a thickness between about 0.001 and about 0.020 inches.

EXAMPLE 2

Brazing Process Using a Ti—Cr Braze Alloy

A titanium chromium braze alloy having a nominal composition of about 56.5 to 57.5 wt % titanium and about 42.5 to about 43.5 wt % chromium was prepared as described in Example 1. The braze alloy was then provided as thin foil having a thickness between about 0.002 and about 0.010 inches thick. A single layer of the titanium-chromium braze alloy foil was placed between two Nb—Si alloy substrate coupons having external dimensions of about 1.0 inch in diameter and 0.25 inches in height. The Nb—Si alloy had the following nominal composition (in atomic percent): 10.0 at % chromium, 2.0 at % aluminum, 23.0 at % titanium, 6.0 at % tantalum, 4.0 at % hafnium, 17.0 at % silicon, and the balance niobium (about 38.0 at %). The coupon and braze foil combination was placed inside a tantalum container, which was then loaded inside a furnace. The atmosphere in the furnace was evacuated to a vacuum level of $5\times10^{-5}$ torr ($5\times10^{-2}$ microns) or below and then back filled with argon gas and maintained under about 400 microns of argon partial pressure. The furnace was then heated to a temperature of between about 1400° C. and about 1425° C. After about 15 minutes, the heat supply was stopped, and the furnace with the brazed specimens inside a titanium container was allowed to cool back to room temperature at a rate of about 50–250° C. per minute.

EXAMPLE 3

Evaluation of Ti—Cr Braze Joint

Figure 2:
FIG. 2 is a scanned image of a SEM micrograph with backscatter electron image (BEI) of a braze joint fabricated from a Ti—Cr braze alloy according to the present invention.

Joints brazed with Ti—Cr braze alloy evaluated using Scanning Electron Microscopy (SEM) showed favorable microstructure, as illustrated in FIG. 1. FIG. 1 is a secondary electron image (SEI) of the braze joint formed in Example 2. FIG. 2 is a backscatter electron image (BEI) micrograph of the same braze joint. The results of the semi-qualitative X-ray energy dispersing analysis (XEDA) are listed below in Table 4. The following joint microstructure was indicated; the silicide content in wt % was 21Hf-22Si-29Ti-26Nb-2Cr. The braze joint had a Laves phase (larger particles) in wt % of 18 Hf-10Si-10Ti-20Nb-40Cr. The joint had a beta phase (matrix) in wt % of 15Hf-5Si-28Ti-40Nb-12Cr. The microhardnesses of the phases in the joint were $HK_{50}$ 1050 to 1200 (silicide), $HK_{50}$ 1400 to 1700 (laves), and $HK_{50}$ of 470–500 (matrix), respectively.

TABLE 4

Semi-Quantitative X-ray Energy Dispersive Analysis of Ti-Cr Brazed Joint

| Phase in the Joint | Composition (wt. %)[1] | | | | | Microhardness |
| --- | --- | --- | --- | --- | --- | --- |
| | Hf | Si | Ti | Cr | Nb | Knoop ($HK_{50}$) |
| Silicide | 21 | 22 | 29 | 2 | 26 | 1050–1200 |
| Laves Phase | 18 | 10 | 28 | 12 | 20 | 1400–1700 |
| Beta phase (Matrix) | 15 | 5 | 28 | 12 | 40 | 470–500 |

[1]The values are expressed in weight percent based upon the total weight of the alloy.

It can be seen from the micrographs illustrated in FIGS. 1 and 2 that the braze joints have various similar microstructure to the bulk matrix of the Nb—Si substrate.

EXAMPLE 4

Brazing Process Using a Ti—Si Braze Alloy

Figure 3:
FIG. 3 is a scanned image of a SEM micrograph with the secondary electron image (SEI) of a braze joint fabricated from a Ti—Si braze alloy according to the present invention.
Figure 4:
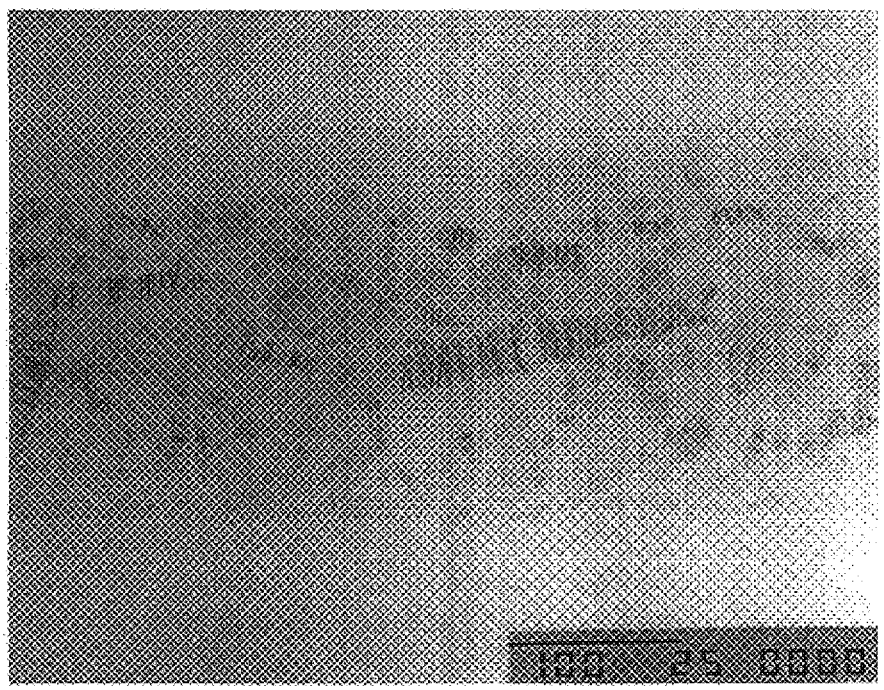
FIG. 4 is a scanned image of a SEM micrograph with the backscatter electron image (BEI) of a braze joint fabricated from a Ti—Si braze alloy according to the present invention.

A titanium-silicon braze alloy having a nominal composition of about 90.5 to 91.5 wt % titanium and about 8.5 to 9.5 wt % silicon was prepared as described in Example 1. The braze alloy was then provided as thin foil having a thickness between about 0.002 and about 0.010 inches. A single layer of the titanium-silicon braze alloy foil was placed between two Nb—Si alloy coupons described above in Example 2. Two Nb—Si alloy coupons were joined using the procedure also described in Example 2. The joint microstructure was evaluated using SEM. FIG. 3 is a SEI micrograph of the Ti—Si braze joint. FIG. 4 is a BEI micrograph of the Ti—Si braze joint. From an evaluation of the SEM images in FIGS. 3 and 4, it can readily be seen that the joint microstructure essentially resembles the bulk matrix of the Nb—Si alloy coupon. Table 5 below lists the joint microstructure and the microhardness of the Ti—Si alloy joint.

TABLE 5

Semi-Quantitative X-ray Energy Dispersive Analysis of Ti-Si Brazed Joint[1]

| Phase in the Joint | Composition (wt. %) | | | | | Microhardness |
|---|---|---|---|---|---|---|
| | Hf | Si | Ti | Ta | Nb | Knoop (HK$_{50}$) |
| Silicide | 6 | 23 | 59 | 2 | 10 | 1280–1345 |
| Beta phase (Matrix) | 3 | 4 | 57 | 8 | 23 | 390–410 |

[1]The values are expressed in weight percent based upon the total weight of the alloy.

It can be seen from the micrographs illustrated in FIGS. 3 and 4 that the braze joints have some similar microstructure to the bulk matrix of the Nb—Si substrate.

EXAMPLE 5

Mechanical Testing of the Nb—Si Joints Fabricated With a Ti—Cr Braze Alloy

Figure 5:
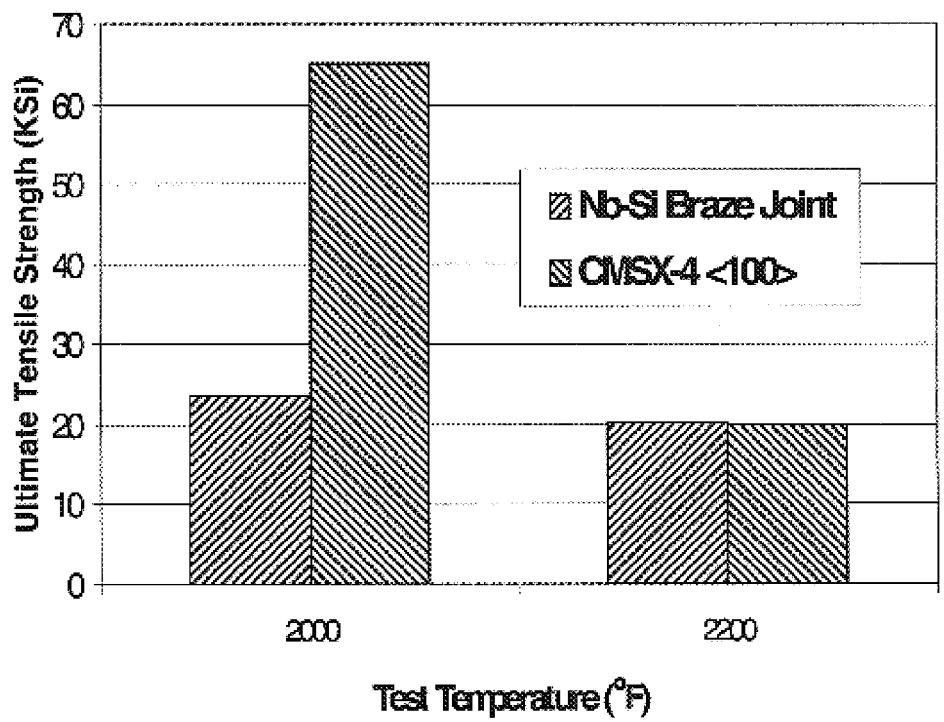
FIG. 5 is a bar graph illustrating the high temperature tensile test results of niobium-silicon alloy joints brazed with a Ti—Cr braze alloy.

The test coupons joined using the Ti—Cr braze alloys discussed in Example 2 were evaluated. The coupons were machined to provide tensile test specimens. The tensile test specimens were then subjected to tensile testing in air at temperatures of 1093° C. (2000° F.) and 1104° C. (2200° F.), respectively. Table 6 illustrates the high-temperature tensile test results. Three out of the four tested specimens failed at the Nb—Si alloy base materials rather than at the Ti—Cr brazed joints. The results were compared with nickel base superalloy CMSX-4 base metal. FIG. 5 is a bar graph illustrating the comparison of ultimate tensile strength (UTS) between Nb—Si brazed joints and CMSX-4 base metal alloy. CMSX-4 is a second generation, single crystal, superalloy with a nominal composition (wt %) of 6.5 Cr, 10.0 Co, 0.6 Mo, 6.0 W, 1.0 Ti, 5.6 Al, 6.0 Ta, 3.0 Re, 0.1 Hf and the balance nickel. The average UTS of Nb—Si braze joints was greater than 20.3 Ksi at 1104° C. 2200° F. and exceeded the UTS of CMSX-4 single crystal base metal alloy at that temperature.

TABLE 6

Ultimate Tensile Strengths of the Nb-Si Alloy Joints Fabricated with a Ti-Cr Braze Composition

| Test Temperature (° F.) | Nb-Si Alloy Brazed Joint | CMSX-4 Base Metal Alloy |
|---|---|---|
| 2000° F. | 23.7 Ksi | 66 Ksi |
| 2200° F. | 20.3 Ksi | 20 Ksi |

EXAMPLE 7

Evaluation of the Braze Oxidation Resistance of the Nb—Si Alloy Joints Fabricated with Ti—Cr Braze Alloy The Nb—Si joints brazed with Ti—Cr alloy were exposed in air for 10 hours at 1104° C. (2200° F.) or 1315.5° C. (2400° F.), respectively. After the exposure, the joints were evaluated metallographically and by using SEM analysis.

Figure 6:
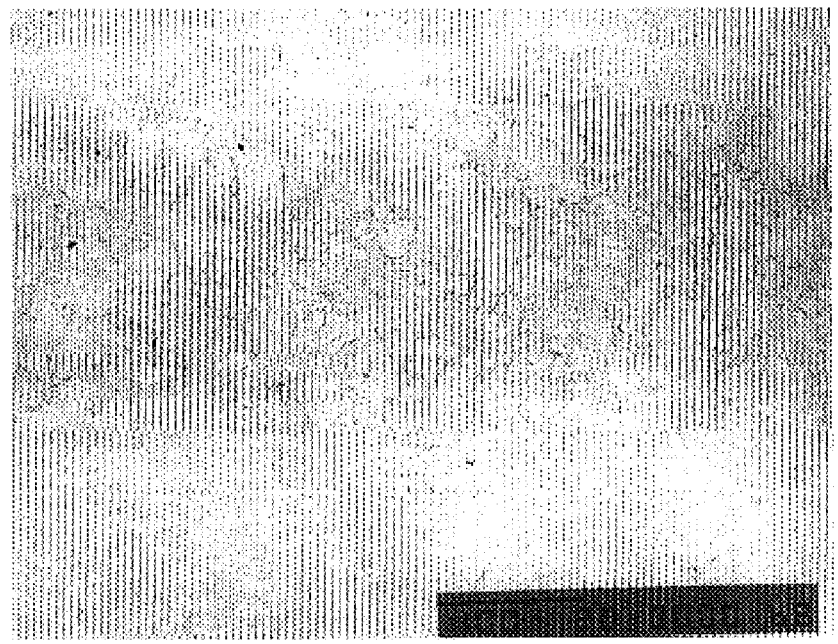
FIG. 6 is a scanned image of a SEM micrograph with the SEI of a Ti—Cr containing braze joint as brazed condition.
Figure 7:
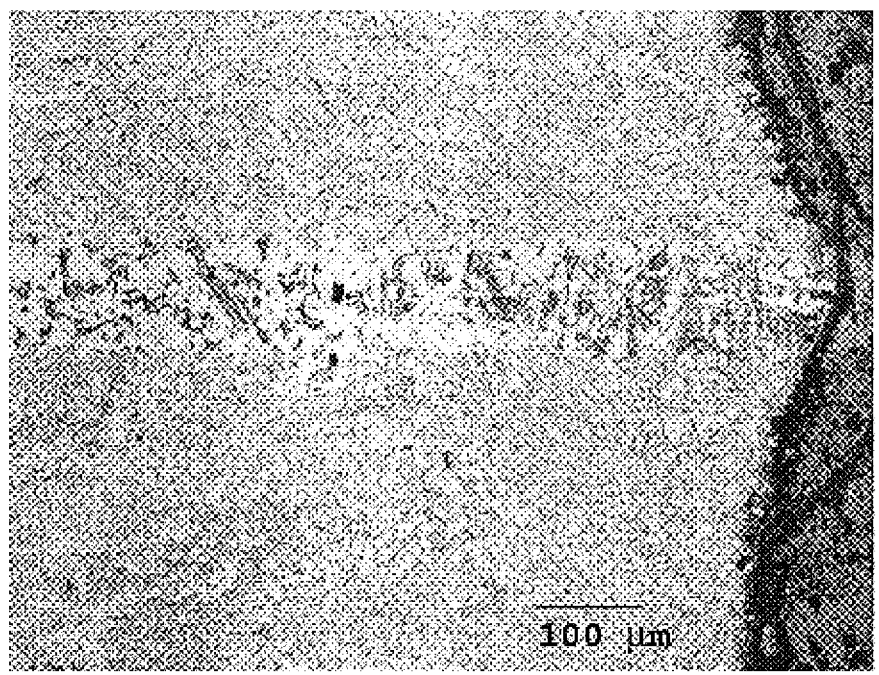
FIG. 7 is a scanned image of a micrograph obtained from the optical metallographic image of a Ti—Cr brazed joint after exposure to a temperature of 1315° C. for 10 hours.
Figure 8:
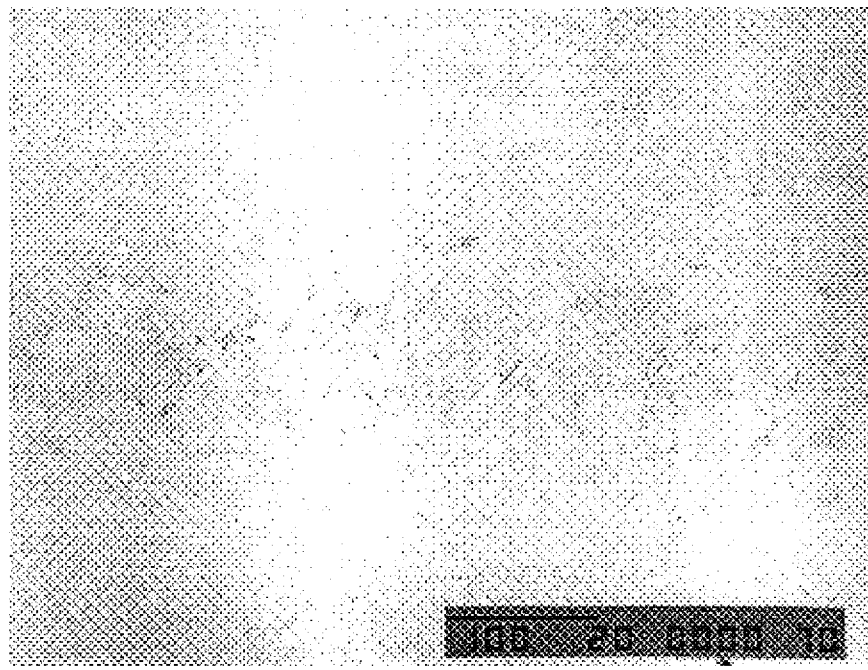
FIG. 8 is a scanned image of a SEM micrograph with the SEI of a Ti—Cr brazed joint after exposure to a temperature of 1315° C. for 10 hours.

FIG. 6 is a SEM micrograph of the Nb—Si alloy joints fabricated with Ti—Cr braze alloy joint as the initially brazed condition. FIGS. 7 and 8 are micrographs of the same joint after exposure to air at 1104° C. for 10 hrs (FIG. 7 is an optical metallographical image, and FIG. 8 is a SEM image). The joints showed good oxidation resistance at high temperatures between 1104° C. (2200° F.) and 1315.5° C. (2400° F.). Neither preferential internal oxidation nor incipient melting were observed in the joints. The presence of Laves phase and high Hf content in the joints may have very positive effects on the joint oxidation resistance.

EXAMPLE 8

Braze Composition of Mixed High-Melt and Low-Melt Alloy Powders

A braze composition can be obtained by mixing two or more alloys in powder form. For example, any of the alloys listed in Table 2 can be prepared and/or purchased from Crucible Research, located in Pittsburgh, Pa. The braze composition including an alloy mixture typically includes two powdered constituents. The first constituent is a high temperature powder, such as any of alloys 15, 17, 18, 19 and 20 listed in Table 2, with a melting temperature well above the brazing temperature. The second constituent includes a low temperature braze alloy, such as any of alloys 11, 12, 13, 14 and 16 listed in Table 2, selected to have a melting temperature below the brazing temperature. Typically the low temperature alloy is selected to have a melting temperature below 1415° C. The low-melt alloy can also, but is not required to, function as an alloy to join the high-melt powder particles together, and to join the mixture composite to the component(s) being joined or repaired.

A braze alloy composition listed in Table 7 below consisting essentially of about 13.5 Cr, about 25.1 Ti, about 12.0 Si, about 1.3 Al, about 3.7 Ta, about 39.2 Nb, about 4.5 Hf, and about 0.8 B (wt. %) can be obtained by mixing (blending), in powder form, alloys 12, 13, 14, 15, 16 and 19 in Table 2. The mixture includes in weight percentage based upon the total weight of the alloy mixture: 15 wt % alloy 12; 15 wt % alloy 13; 20 wt % alloy 14; 40 wt % alloy 15; 5 wt % alloy 16; and 5 wt % alloy 19. This braze alloy powder mixture includes about 50 wt % of a low-melt powder component and about 50 wt % of a high-melt powder component. The high-melt powder component is formed from high-melt alloys 15, 16, and 19. The low-melt powder component is formed from low-melt alloys 12, 13, and 14. The low-melt alloy mixture composition (wt %) is about 26% Cr, 24% Si and 50% Ti. The melting temperatures for the low-melt alloy mixture is in a range between about 1371° C. and about 1401° C. The low-melt alloy is completely molten when the brazing temperature is about 1410° C. to 1420° C.

TABLE 7[1,2]

| Alloy Mixture | Cr | Al | Ti | Ta | Nb | Hf | B | Si | Ge |
|---|---|---|---|---|---|---|---|---|---|
| 25 | 13.5 | 1.3 | 25.1 | 3.7 | 39.2 | 4.5 | 0.8 | 12.0 | 0.01 |

[1]The values are expressed in weight percent based upon the total weight of the alloy.
[2]A value of 0.01 indicates only that this element was not intentionally added to the alloy.

EXAMPLE 9

Braze Composition of Mixed Low-Melt Alloy Powders

Another braze composition of about 24.2% Cr, about 49.4% Ti and about 26.4% Si (wt %) can be prepared by mixing low-melt alloys 12, 13 and 14 in Table 2. The braze composition consists of, in weight percent: 33 wt % alloy 12; 33 wt % alloy 13; and 34 wt % alloy 14. The melting temperature for this alloy mixture is expected to be in a temperature range between about 1371° C. to about 1403° C. This alloy mixture completely melts at a brazing temperature of about 1415° C.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected. It is also contemplated that processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art.

Further, any theory of operation, proof, or finding stated herein is meant to further enhance understanding of the present invention and is not intended to make the scope of the present invention dependent upon such theory, proof, or finding.

What is claimed is:

1. A composition comprising
   a first alloy consisting essentially of
      a base element of about 45 to 91.5 wt % titanium and
      at least one secondary element selected from the group consisting of 0.01–43.5 wt % chromium, 0.01–26.3 wt % aluminum, 0.01–74.5 wt % niobium, 0.01–2.25 wt % boron, 0.01–71.5 wt % silicon, 0.01–53.5 wt % germanium, and mixtures thereof, said first alloy having first melt temperature between about 1300° C. and about 1590° C.; and
   a second alloy consisting essentially of:
      a base element selected from the group consisting of 0.01–91.5 wt % titanium, 0.01–74.5 wt % tantalum, 0.01–98.3 wt % niobium, 0.01–89.5 wt % hafnium, 0.01–71.5 wt % silicon, and 0.01–53.5 wt % germanium, and
      at least one secondary element different from said base element and selected from the group consisting of 0.01–43.5 wt % chromium, 0.01–26.3 wt % aluminum, 0.01–74.5 wt % niobium, 0.01–2.25 wt % boron, 0.01–71.5 wt % silicon, 0.01–53.5 wt % germanium, and mixtures thereof and having a second melt temperature between about 1500° C. and about 1675°.

2. The composition of claim 1 having a melting point of between about 1300° C. and about 1650° C.

3. The composition of claim 1 wherein the first alloy consists essentially of, in percent by weight, between about 24.5% and about 25.1% chromium, between about 22.4% and about 23.4% silicon and the balance titanium.

4. The composition of claim 1 wherein the first alloy consists essentially of, in percent by weight, between about 8.5% and about 9.5% silicon and about 90.5% and about 91.5% titanium.

5. The composition of claim 1 wherein the second alloy includes, in percent by weight, between about 28.5% and about 29.5% chromium and about 70.5% and about 71.5% silicon.

6. The composition of claim 1 wherein the first alloy consists essentially of, in percent by weight, between about 42.5% and about 43.5% chromium and between about 56.5% and about 57.5% titanium.

7. The composition of claim 1 wherein the second alloy includes, in percent by weight, between about 1.95% and about 2.25% boron and between about 97.7% and about 98.3% niobium.

8. The composition of claim 1 wherein the second alloy includes, in percent by weight, between about 10.7% and about 11.3% chromium and between about 88.5% and about 89.5% hafnium.

9. The composition of claim 1 wherein the second alloy includes, in percent by weight, between about 35.5% and about 36.5% chromium and between about 63.5% and about 64.5% niobium.

10. The composition of claim 1 wherein the second alloy, in percent by weight, between about 25.8% and about 26.3% aluminum and between about 73.5% and about 74.5% niobium.

11. The composition of claim 1 wherein the second alloy includes, in percent by weight, between about 25.8% and about 26.3% aluminum and between about 73.5% and about 74.5% tantalum.

12. The composition of claim 1 wherein the second alloy includes, in percent by weight, between about 46.5% and about 47.5% niobium and between about 52.5% and about 53.5% germanium.

13. The composition of claim 1 having a nominal composition comprising, in percent by weight:
   between about 13.0% and about 14.0% chromium;
   between about 0.5% and about 2.0% aluminum;
   between about 24.5% and about 26.0% titanium;
   between about 3.2% and about 4.2% tantalum;
   between about 43.6% and about 44.6% niobium;
   between about 4.0% and about 5.0% hafnium;
   between about 0.3% and about 1.3% boron; and
   between about 11.5% and about 12.5% silicon.

14. The composition of claim 1 comprising, in percent by weight,
   about 35% by weight of the first alloy consisting essentially of between about 24.5% and about 25.1% chromium, between about 22.4% and about 23.4% silicon and the balance titanium;

about 15% of the second alloy consisting essentially of between about 28.5% and about 29.5% chromium and about 70.5% and about 71.5% silicon about 45% of a third braze alloy comprising between about 1.95% and about 2.25% boron and between about 97.7% and about 98.3% niobium; and about 5% of a fourth braze alloy comprising between about 25.8% and about 26.3% aluminum and between about 73.5% and about 74.5% tantalum.

15. The composition of claim 1 provided as a powder having an average particle size between about 38 and about 180 micrometers.

16. The composition of claim 1 provided in foil form having an average thickness of between about 50 and about 300 micrometers.

17. The composition of claim 1 substantially free of nickel, cobalt and gold.

18. The composition of claim 1 having less than about 2.25% by weight of boron.

19. A composition comprising:
 a first alloy consisting essentially of:
  a base element of about 45 to 91.5 Wt % titanium, and
  at least one secondary element selected from the group consisting of up to 43.5 wt % chromium, up to 26.3 Wt % aluminum, up to 98.3 wt % niobium, up to 2.25 Wt % boron, up to 71.5 wt % silicon, up to 53.5 wt % germanium, and mixtures thereof, and
 a second alloy consisting essentially of:
  a base element selected from the group consisting of up to 91.5 wt % titanium, up to 74.5 Wt % tantalum, up to 74.5 wt % niobium, up to 89.5 Wt % hafnium, up to 71.5 Wt % silicon, and up to 53.5 wt % germanium, and
  at least one secondary element different from said base element and selected from the group consisting of up to 43.5 wt % chromium, up to 26.3 wt % aluminum, up to 98.3 wt % niobium, up to 2.25 wt % boron, up to 71.5 wt % silicon, up to 53.5 wt % germanium, and mixtures thereof, wherein said two or more alloys are selected to provide a braze composition having an incipient, first melt temperature and a second, re-melt temperature higher than said first melt temperature.

20. The composition of claim 19 wherein said composition includes at least one binary or ternary alloy.

21. The composition of claim 19 comprising two or more binary or ternary alloys.

22. The composition of claim 19 wherein the first alloy consists essentially of, in percent by weight, between about 24.5% and about 25.1% chromium, between about 22.4% and about 23.4% silicon, and the balance titanium.

23. The composition of claim 19 comprising an alloy including, in percent by weight, between about 8.5% and about 9.5% silicon and about 90.5% and about 91.5% titanium.

24. The composition of claim 19 wherein the second alloy consists essentially of, in percent by weight, between about 28.5% and about 29.5% chromium and about 70.5% and about 71.5% silicon.

25. The composition of claim 19 wherein the first alloy consists essentially of, in percent by weight, between about 42.5% and about 43.5% chromium and between about 56.5% and about 57.5% titanium.

26. The composition of claim 19 wherein the second alloy consists essentially of, in percent by weight, between about 1.95% and about 2.25% boron and between about 97.7% and about 98.3% niobium.

27. The composition of claim 19 wherein the second alloy consists essentially of, in percent by weight, between about 10.7% and about 11.3% chromium and between about 88.5% and about 89.5% hafnium.

28. The composition of claim 19 wherein the second alloy consists essentially of, in percent by weight, between about 35.5% and about 36.5% chromium and between about 63.5% and about 64.5% niobium.

29. The composition of claim 19 wherein the second alloy consists essentially of, in percent by weight, between about 25.8% and about 26.3% aluminum and between about 73.5% and about 74.5% niobium.

30. The composition of claim 19 wherein the second alloy consists essentially of, in percent by weight, between about 25.8% and about 26.3% aluminum and between about 73.5% and about 74.5% tantalum.

31. The composition of claim 19 wherein the second alloy consists essentially of, in percent by weight, between about 46.5% and about 47.5% niobium and between about 52.5% and about 53.5% germanium.

32. The composition of claim 19 having a nominal composition comprising, in percent by weight:
 between about 13.0% and about 14.0% chromium;
 between about 0.5% and about 2.0% aluminum;
 between about 24.5% and about 26.0% titanium;
 between about 3.2% and about 4.2% tantalum;
 between about 37.2% and about 41.2% niobium;
 between about 4.0% and about 5.0% hafnium;
 between about 0.3% and about 1.3% boron; and
 between about 11.5% and about 12.5% silicon.

33. The composition of claim 19 comprising, in percent by weight:
 about 35% by weight of the first braze alloy consisting essentially of: between about 24.5% and about 25.1% chromium, between about 22.4% and about 23.4% silicon, and the balance titanium;
 about 15% of the second braze alloy consisting essentially of: between about 28.5% and about 29.5% chromium and about 70.5% and about 71.5% silicon;
 about 45% of a third braze alloy comprising between about 1.95% and about 2.25% boron and between about 97.7% and about 98.3% niobium; and
 about 5% of a fourth braze alloy comprising between about 25.8% and about 26.3% aluminum and between about 73.5% and about 74.5% tantalum.

34. The composition of claim 19 provided as a powder having an average particle size between about 38 and about 180 micrometers.

35. The composition of claim 19 provided in foil form having an average thickness of between about 50 and about 300 micrometers.

36. The composition of claim 19 substantially free of nickel, cobalt, and gold.

37. The composition of claim 19 having less than about 2.25% by weight of boron.

38. The composition of claim 19 comprising a mixture of the first alloy having a first melt temperature between about 1300° C. and about 1590° C. and the second alloy having a second melt temperature between about 1500° C. and about 1675° C.

* * * * *